United States Patent
Catchpole (10) Patent No.: US 8,644,467 B2
(45) Date of Patent: Feb. 4, 2014

(54) VIDEO CONFERENCING SYSTEM, METHOD, AND COMPUTER PROGRAM STORAGE DEVICE

(75) Inventor: Jason Catchpole, Hamilton (NZ)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 13/227,156

(22) Filed: Sep. 7, 2011

(65) Prior Publication Data

US 2013/0057642 A1 Mar. 7, 2013

(51) Int. Cl.
*H04M 11/00* (2006.01)

(52) U.S. Cl.
USPC .................................. 379/93.21; 348/14.03

(58) Field of Classification Search
USPC ............ 348/14.01, 14.03, 14.04, 14.08, 14.1, 348/14.16; 379/93.21, 158, 202.01, 204.01
See application file for complete search history.

(56) References Cited

PUBLICATIONS

Kusuma Agusanto, Li Li, Zhu Chuangui, and Ng Wan Sing. Photorealistic Rendering for Augmented Reality using Environment Illumination. In ISMAR '03: Proceedings of the 2nd IEEE and ACM International Symposium on Mixed and Augmented Reality, p. 208, Washington, DC, USA, 2003. IEEE Computer Society.
Masayuki Kanbara and Naokazu Yokoya. Geometric and Photometric Registration for Real-Time Augmented Reality. In International Symposium on Mixed and Augmented Reality (ISMAR'02), p. 279, Darmstadt, Germany, Sep. 30-Oct. 1, 2002. IEEE.
Julien Pilet, Vincent Lepetit, and Pascal Fua. Augmenting Deformable Objects in Real-Time. In ISMAR '05: Proceedings of the Fourth IEEE and ACM International.
Digital Video Enterprises AR Telepresence [PDF Enclosed].
Digital Video Enterprises http://www.dvetelepresence.com/.
Digital Video Enterprises Immersion Room http://www.dvetelepresence.com/room/home.htm.
Digital Video Enterprises Immersion Room http://www.dvetelepresence.com/room/presentation.htm.
Polycom People + Content http://www.polycom.com/products/telepresence_video/accessories/vsx_accessories/people_content_ip.html.
Telkom Indonesia: Augmented Reality Presentation http://www.youtube.com/watch?v=E8gbKkkpEfk.
D'Fusion: Total Immersion Demo http://video.google.com/videoplay?docid=-4460631404440161 06#.
Sing-Tell AR Presentation http://www.penn-olson.com/2011/04/20/augmented-reality-in-asia/.
ARToolworks http://www.artoolworks.com.
M. Billinghurst and H. Kato, "Real World Teleconferencing", Proceedings of the Conference on Human Factors in Computing Systems (CHI 99), Pittsburgh, USA, May 15th-20th, 1999.
I. Barakonyi, T. Fahmy, D. Schmalstieg, "Remote Collaboration Using Augmented Reality Videoconferencing", In Proc. of Graphics Interface 2004 (GI'04), May 17-19, London, ON, Canada, pp. 89-96.

(Continued)

*Primary Examiner* — Olisa Anwah
(74) *Attorney, Agent, or Firm* — Oblon, Spivak, McClelland, Maier & Neustadt, L.L.P.

(57) ABSTRACT

A video-conferencing device for presenting augmented images that includes at least one interface, a network and a computer processor programmed to receive first information identifying a scene via the at least one interface. The computer processor also detects whether the scene contains at least one marker and identifies a location of each detected marker within the scene. In response to determining that the scene contains a first marker and based on the location of the first marker, the computer processor then augments the portion of the scene containing the first marker with second information. The computer processor then transmits the augmented scene to at least one external device via the network.

17 Claims, 5 Drawing Sheets

(56) References Cited

PUBLICATIONS

Hansung Kim, Seung jun Yang, and Kwanghoon Sohn. 3D Reconstruction of Stereo Images for Interaction between Real and Virtual Worlds. In ISMAR '03: Proceedings of the The 2nd IEEE and ACM International Symposium on Mixed and Augmented Reality, p. 169, Washington, DC, USA, 2003. IEEE Computer Society.

Natsuki Sugano, Hirokazu Kato, and Keihachiro Tachibana. The Effects of Shadow Representation of Virtual Objects in Augmented Reality. In ISMAR '03: Proceedings of the 2nd IEEE and ACM International Symposium on Mixed and Augmented Reality, p. 76, Washington, DC, USA, 2003. IEEE Computer Society.

VIDEO CONFERENCING SYSTEM, METHOD, AND COMPUTER PROGRAM STORAGE DEVICE

BACKGROUND

1. Technical Field

The disclosure relates to a video conference device, associated methodology and non-transitory computer program storage device utilizing augmented reality to implement augmented images during a video conference.

2. Description of the Related Art

When performing video communication between a sending endpoint and a receiving endpoint, video conferencing systems employ two video channels to convey information therebetween. A "main" video channel includes video information of a scene recorded by an imaging device, such as remote audience members of a conference or a presenter, whereas the second video channel is connected to a variety of external devices to receive additional video information such as presentation material. However, the use of these two communication channels in video conferencing systems leads to a variety of problems.

One problem with sending the scene video information over a different video channel than that of the presentation material is that the presenter is no longer in the same physical space as the presentation thereby making natural interaction with the presentation difficult. In other words, the remote audience members at the receiving endpoint either see the presenter or the presentation material such that the only way the presenter can point information out within the presentation material is by using a mouse on the PC or a remote. However, presentations are most effective when remote audience members are able to see the actual presenter along with any interactions or hand gestures the presenter has with respect to presenting the presentation material.

Another problem with typical video conferencing equipment is that the presenter does not always know when remote audience members at the receiving endpoint can see him as remote users may be using a small device only large enough to show either the main video of the presenter or the secondary video of the presentation material. This places an additional burden on the presenter in that he cannot establish any type of eye contact with the remote audience members when he does not even know if the remote audience members can see him. Therefore, because the configuration of the video conferencing device on the receiving endpoint is unknown, any actual eye contact made by the presenter may be pointless as the remote audience members may switch to looking solely at the presentation material via the second video channel or switch to looking at the presenter via the main video channel and the presenter will be unaware of the changes.

SUMMARY

The present disclosure describes a video conferencing system and associated methodology for using augmented reality to present augmented images of the presentation material in a way that solves the above-noted problems. As such, the video conferencing system merges computer-generated graphics of presentation material into real-world environments by inserting 2D or 3D objects into the live main channel video feed from the imaging device thereby requiring only one video channel and providing a presentation as it would be performed locally such that remote audience members can see both the presenter and the presentation material. Further, the presenter can make use of eye contact and hand gestures to actively engage the remote audience members. In addition, the computer-generated images of the presentation material can be attached to physical objects allowing the images to be physically interacted and/or moved as if the presentation was being performed locally in a conference room.

In order to solve at least the above-noted problems, the present disclosure relates to a video-conferencing device, associated methodology and non-transitory computer program for presenting augmented images that includes at least one interface, a network and a computer processor programmed to receive first information identifying a scene via the at least one interface. The computer processor also detects whether the scene contains at least one marker and identifies a location of each detected marker within the scene. In response to determining that the scene contains a first marker and based on the location of the first marker, the computer processor then augments the portion of the scene containing the first marker with second information. The computer processor then transmits the augmented scene to at least one external device via the network.

The foregoing description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by the specification. The scope of the advancements embraced by the specification and drawings are defined by the words of the accompanying claims.

DETAILED DESCRIPTION OF THE EMBODIMENTS

Referring now to the drawings, wherein like reference numerals designate identical or corresponding parts throughout the several views, the following description relates to a device and associated methodology for a video conferencing device for presenting augmented images. The video conferencing device includes at least one interface, a network and a computer processor programmed to receive first information identifying a scene via the at least one interface. The computer processor also detects whether the scene contains at least one marker and identifies a location of each detected marker within the scene. In response to determining that the scene contains a first marker and based on the location of the first marker, the computer processor then augments the portion of the scene containing the first marker with second information. The computer processor then transmits the augmented scene to at least one external device via the network.

Figure 1:
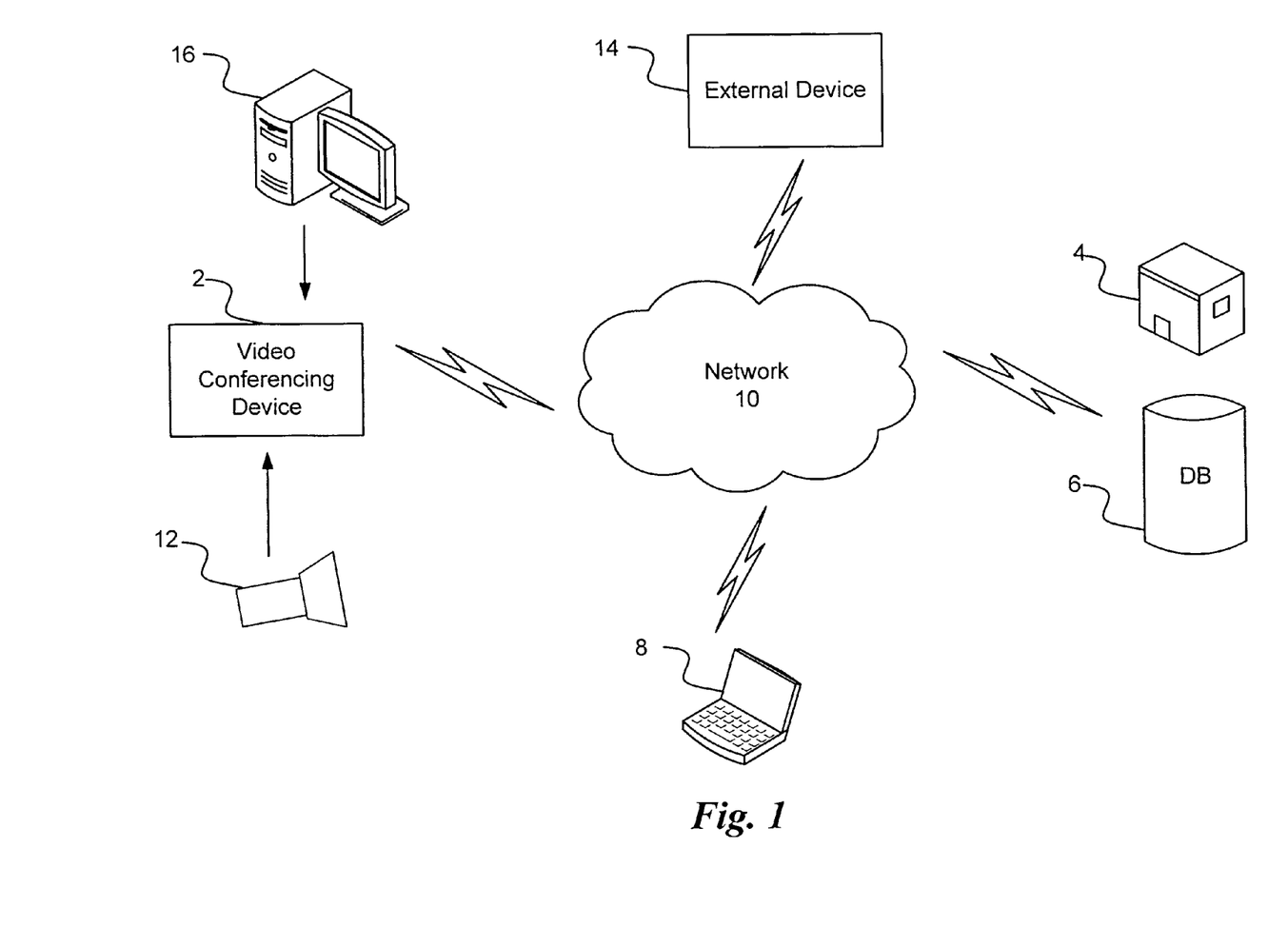
FIG. 1 is a schematic diagram of a video conferencing system for presenting augmented images according to an exemplary embodiment.

FIG. 1 is a schematic diagram of a video conferencing system for presenting augmented images according to an exemplary embodiment. In FIG. 1, a video conferencing device 2 is connected to a server 4, a database 6, a mobile device 8 and an external device 14 via a network 10. The video conferencing device 2 is also connected to an imaging device 12 and a PC 16. The server 4 represents one or more servers connected to the video conferencing device 2, the database 6, the mobile device 8 and the external device 14 via the network 10. The database 6 represents one or more databases connected to the video conferencing device 2, the server 4, the mobile device 8 and the video conferencing device 14 via network 10. The mobile device 8 represents one or more mobile devices connected to the video conferencing device 2, the server 4, the database 6 and the external device 14 via the network 10. The external device 14 represents one or more external devices connected to the video conferencing device 2, the server 4, the database 6 and the mobile device 8 via the network 10. The network 10 represents one or more networks, such as the Internet, connecting the video conferencing device 2, the server 4, the database 6, the mobile device 8 and the external device 14.

The video conferencing device 2 receives imagery of a surrounding scene from the imaging device 12 connected to the video conferencing device 2. The scene imagery can be any type of information, such as streaming video, recorded by the imaging device 12 but in the context of the present disclosure relates to environments in which a presentation is made by the presenter. The video conferencing device 2 then determines which device, such as the PC 16 and/or the mobile device 8, from which to obtain the presentation material. Once the video conferencing device 2 has obtained the presentation material, the video conferencing device 2 identifies whether the scene imagery obtained from the imaging device 12 contains at least one marker. Once the marker is detected, the video conferencing device 2 identifies a location of the marker within the scene imagery and augments a portion of the scene imagery containing the first marker with video information of presentation material received from local devices such as the computer 16 or externally from the server 4 or mobile device 8 via network 10. The size and orientation of the augmentations depends on the location of the marker such that the video conferencing device augments the scene imagery with the presentation material while also still leaving room in the scene imagery to show the presenter. At this point, the video information on the main video channel includes video of the presenter within the scene imagery along with an augmented image containing the presentation material. The augmented video information is then transmitted to the external device 14 to be displayed to remote audience members.

The augmented scene including both the presentation material and video information of the presenter is included in a single (main) video channel without the need for the second video channel. This provides the advantages that the receiving endpoint video conferencing system does not have to worry about handling multiple video feeds and therefore enables remote audiences having both simple and complex video conferencing systems to receive the same presentations. The use of the single main video channel also requires less bandwidth than using two video channels thereby allowing for better connections between the endpoints and higher quality video.

Figure 2:
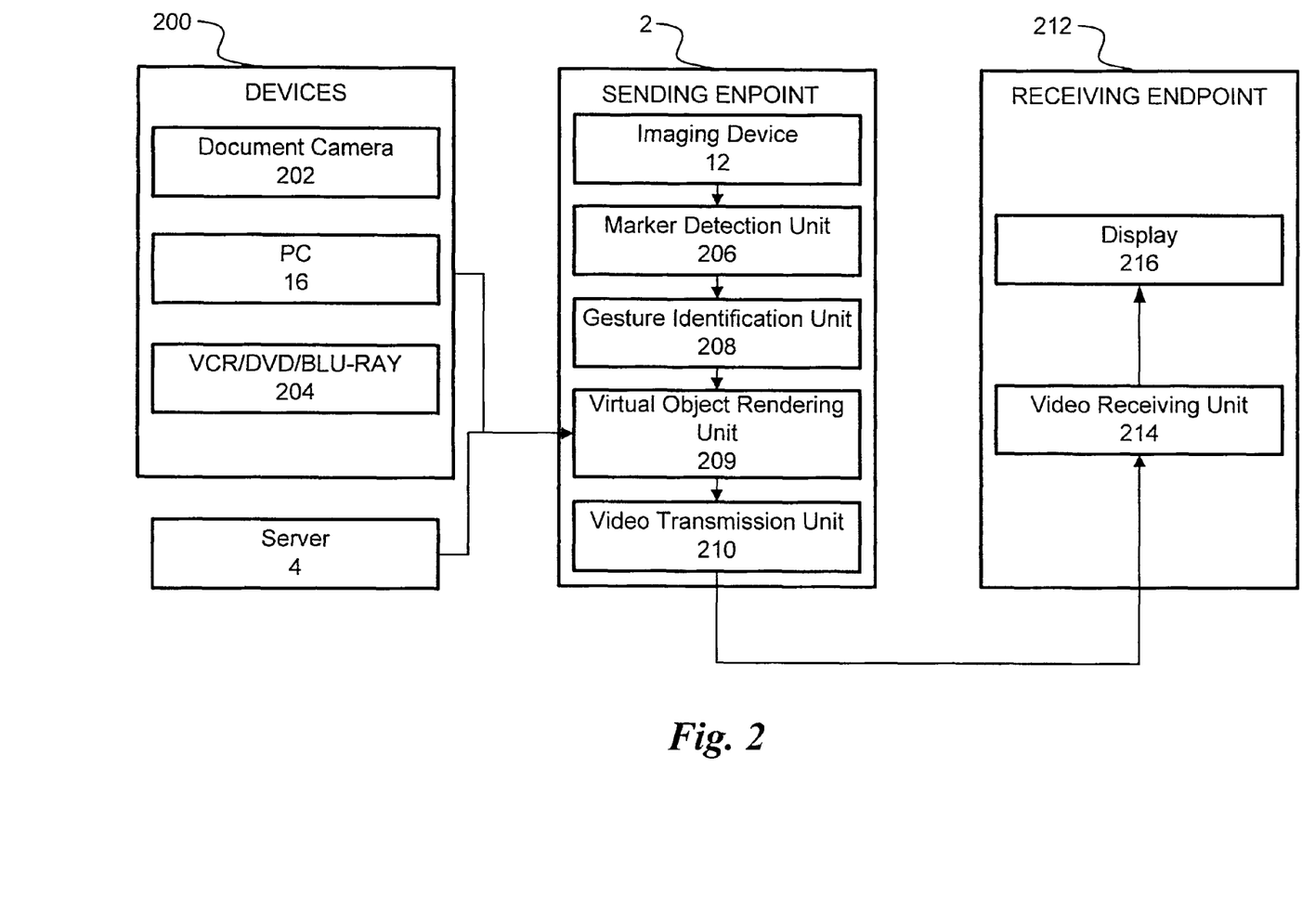
FIG. 2 is a flow diagram of a video conferencing system for presenting augmented images according to an exemplary embodiment.

FIG. 2 is a flow diagram of a video conferencing system for presenting augmented images according to an exemplary embodiment. The computer 16, server 4, database 6, and video conferencing device 2 of FIG. 1 are illustrated in FIG. 2 and therefore like designations are repeated. In FIG. 2, a plurality of devices 200 are connected to the sending endpoint video conferencing device 2 which is in turn connected to a receiving endpoint 212. The devices 200 transmit presentation material to the video conferencing device 2 to be included as a virtually rendered augmented image over a marker identified in the scene imagery recorded on the main video channel by imaging device 12. The video conferencing device 2 can receive presentation material from a document camera 202, PC 16, VCR/DVD/BLU-RAY player 214, and/or the server 4. For example, the document camera 202 can record image information that is transmitted directly to the video conferencing device 2 as presentation material. The document camera 202 could also be the mobile device 8 such that information stored within the mobile device 8 or pictures taken by the mobile device 8 can be transmitted to the video conferencing device 2 as presentation material. The PC 16, VCR/DVD/BLU-RAY player 214 and server 4 can also provide any type of presentation material, such as Microsoft™ Power Point™ presentations, Microsoft™ Word™ documents or any other presentation material that would be recognized by one of ordinary skill in the art.

The video conferencing device 2 includes the imaging device 12, a marker detection unit 206, a virtual object rendering unit 209, a gesture identification unit 208 and a video transmission unit 210. The imaging device 12 records live streaming video of scene imagery as a series of frames that are then passed to the marker detection unit 206. The marker detection unit 206 then analyzes the scene imagery frame by frame to determine whether the scene contains any markers.

To ensure better recognition by the video conferencing device 2, the markers can be designed with specific patterns such that they are more easily detected and extracted by the video conferencing device 2. Markers can be designed to be clearly identifiable inside a view of the scene such that they can be easily extracted by the marker detection unit 206. Types of markers include retro-reflective markers, printed markers with unique patterns allowing the marker detection unit 206 to determine which marker it is seeing, active markers which emit light to stand out more from the rest of the scene imagery, or any other pattern discerned from the scene imagery as would be understood by one of ordinary skill in the art.

Once any potential markers are detected by the marker detection unit 206, the marker detection unit 206 calculates reference points of the markers within the scene imagery frames such that virtual augmentations can then be geometrically calibrated by defining the location of marker in the real world with respect to the marker reference points. The marker detection unit 206 then calculates the imaging device's 12 pose in relation to the reference points and together with knowledge of the augmentation's calibration, calculates the relationship between the imaging device's pose and that of a virtual object to be rendered such as the presentation material.

This relationship allows the virtual object to be rendered so as to appear attached to the marker.

Once the markers have been identified by the marker detection unit 206, the frame is input into the gesture identification unit 208 to identify if there is at least one gesture by the presenter which can affect the presentation and/or content of the presentation material. The gesture identification unit 208 analyzes the presenters pose in each frame to determine whether the presenter has given a specific gesture recognized by the gesture identification unit 208. If the specific gesture is recognized by the gesture identification unit 208, the frame is transmitted to the virtual object rendering unit 209 so that it can be rendered based on the gesture. Otherwise, the frame is input into the virtual object rendering unit 209 and the original unmodified presentation material is rendered. More information with respect to specific gestures recognized by the gesture identification unit 208 is provided below with respect to FIG. 4.

In one exemplary embodiment of the present invention, the virtual object rendered is based on which devices 200 are connected to the video conferencing device 2 and which of the devices 200 the presenter has chosen to enable. For example, presentation material can be obtained from the server 4 via the use of Quick Response (QR) codes embedded within the markers located within the scene imagery. QR codes are encoded images that contain binary or textual data, such as a Uniform Resource Locator (URL), that when decoded can be used by the video conferencing device 2 to retrieve the presentation material. For example, when a marker is detected by the marker detection unit 206 as containing QR codes, the video conferencing device 2 decodes the QR code to obtain the URL. The URL can then be used by the video conferencing device 2 to obtain presentation material from the server 4 via the network 10. Once the video conferencing unit 2 receives the presentation material, it can then be rendered by the virtual object rendering unit 209. For example, the URL could represent the presenter's personal webpage under which a current presentation is maintained in the database 6 and obtained from the server 4 via the network 10. The presenter could them simply update the current presentation at any time and the QR code that points to the presenters URL would not change thereby alleviating the need for a new marker for every presentation. However, as the use of QR codes does not require an external device 200, such as PC 16, to be connected to the video conferencing device 2, the control and/or navigation of the presentation material may be accomplished via other means in addition to or separate from using a remote and/or PC 16. These means are described later in more detail with respect to FIG. 4.

Using QR codes to obtain the presentation material provides a variety of advantages. First, only one piece of hardware, the video conferencing device 2, is required when presenting the presentation material to remote audience members. This lowers the amount of setup time required when preparing for a presentation and also eliminates any risk of hardware problems or glitches when trying to connect the PC 16 to the video conferencing device 2 to obtain the presentation material. Further, the presenter would no longer have the physical burden of having to relocate the PC 16 storing the presentation material and in fact could avoid the financial burden of having to buy a PC 16 for the video conferencing device 2 as the presentation material could all be stored remotely. The use of QR codes also negates problems frequently encountered with ensuring that the resolution of the video output from the PC 16 is not too high.

Presentation material, such as a Power Point™ presentation can also be obtained by enabling the PC 16 or any of the other devices 200 storing the Power Point™ presentation. If the presenter chooses the PC 16, the virtual object rendering unit 209 receives the video frame from the PC 16 video input and then renders the frame inside the main video frame with the virtual object utilizing the main video channel. This rendering is performed using 3D graphics rendering library, such as OpenGL or DirectX, as the video frame must be rendered as a surface on a flat polygon in a three dimensional environment in order to permit physical manipulation of the virtual object as though it were real. This allows the presenter to actually pick up the marker and move it around within the scene imagery just as he would if he were giving a presentation to a local audience.

The ability to move the marker containing the presentation material as if it were a real presentation also provides the presenter with the ability to include information on the "backside" of the virtually rendered presentation material. In other words, the presentation material produced as a virtually rendered augmented image onto the marker by the virtual object rendering unit 209 can include different information on the "backside" of the augmented image that can be seen by remote audience members when the marker is turned by the presenter. For example, the information on the backside can include biographical information about the presenter or additional information relating to the presentation material such as a webpage or an image the speaker is currently discussing in the presentation. This information can also be provided to the video conference device 2 via a different external device 200. Thus, the presentation material on the front side of the augmented image may be received by the video conferencing device 2 from the PC 16 whereas the information on the backside of the presentation material may be provided by the VCR/DVD/BLU-RAY 204.

Returning to the discussion of FIG. 2, once the presentation material has been rendered by the virtual object rendering unit 209 as a virtual object inside the main video frame via the marker detected by the marker detection unit 206, the frame is input into video transmission unit 210 which transmits the frame including both the presenter and the presentation material to the receiving endpoint 212 via the video receiving unit 214. The video receiving unit 214 then transmits the video to be displayed to remote audience members via display 216.

As can be seen from FIG. 2, another advantage provided by the present invention is that the receiving endpoint video conferencing system does not have to be changed in any way to view the video information containing the presenter and presentation material received from the video conferencing device 2. Therefore, entities or individual users are not required to purchase additional video conferencing equipment when communicating with the video conferencing device 2.

Figure 3:
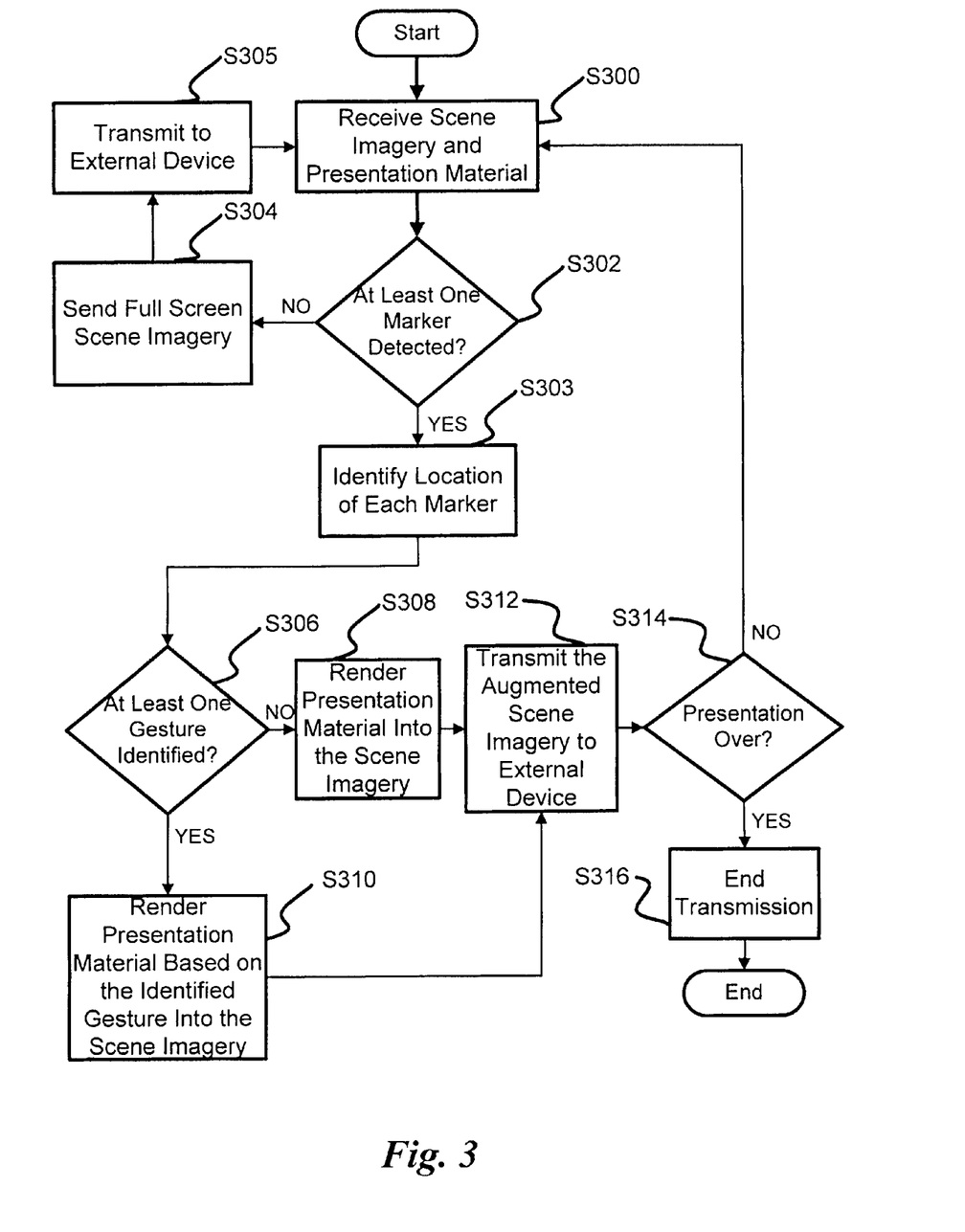
FIG. 3 is an algorithmic system flowchart for presenting augmented images via a video conferencing device according to an exemplary embodiment.

FIG. 3 is an algorithmic system flow chart for presenting augmented images via the video conferencing device 2 according to an exemplary embodiment. At step S300, the video conferencing device 2 receives video information of scene imagery from the imaging device 12 and the presentation material from one of the external devices 200. The video conferencing device 2 via the marker detection unit 206 then processes the video information to detect whether there is at least one marker within the scene imagery received from the imaging device 12 at step S302. At step S304, if no markers are detected within the scene imagery received from the imaging device 12, the video conferencing device 2 transmits only the scene imagery to the external device 14 at step S305 such that the presenter will be the only thing the remote audience members see. Processing then returns to receiving addition scene imagery at step S300.

If there is at least one marker identified within the scene imagery, the video conferencing device 2 via the marker detection unit 206 determines at step S303 the location of the marker within the scene imagery such that the size and orientation of the presentation material to be virtually rendered still leaves room in the scene imagery to show the presenter. It should be noted that the presenter may start a presentation without the use of a marker thereby sending remote audience members video only of himself in order to get the full attention of the remote audience members when making opening remarks. After completion of the opening remarks, the presenter may then bring a marker within the scene imagery in order to enable the remote audience members to see the presentation material.

Upon identifying the location of each detected marker at step S303, the gesture identification unit 208 then determines whether at least one gesture has been identified from the presenter at step S306. If no gestures are recognized by the gesture recognition unit 208, the virtual object rendering unit 209 renders the originally received presentation material into the scene imagery at step S308. The video conferencing unit 2 then transmits the augmented scene imagery to the external device 14 at step S312. Processing then proceeds to step S314 to determine whether the presentation is over. If the presentation is not over, then processing proceeds back to step S300 to receive additional frames and if the presentation is over, then the transmission of video information from the video conferencing device 2 to the external device 14 is ended at step S316. Returning to step S306, if the video conferencing device 2 recognizes gestures from the presenter then the presentation material is altered at step S310 based on the gestures identified at step S306 and the modified presentation material is rendered into the scene imagery. The video information containing the augmented scene imagery is then transmitted to the external device 14 at step S312. Processing then proceeds to step S314 to determine whether the presentation is over. If the presentation is not over, then processing proceeds back to step S300 to receive additional frames and if the presentation is over, then the transmission of video information from the video conferencing device 2 to the external device 14 is ended at step S316. Therefore, a presentation can change based on the actions of the presenter such that the presenter may introduce a marker into the scene imagery when specifically discussing the presentation material and remove the marker from the scene imagery when he wants the full attention of the remote audience members.

It should be noted that if more than one marker is detected, the video conferencing device 2 chooses a "presentation" marker within the scene imagery to display the video information containing the presentation material obtained from the one of the devices 200. As such, when selecting a marker to be used for the virtual rendering of the presentation material, the video conferencing device 2 picks based on the pattern identified on the marker itself.

Figure 4:
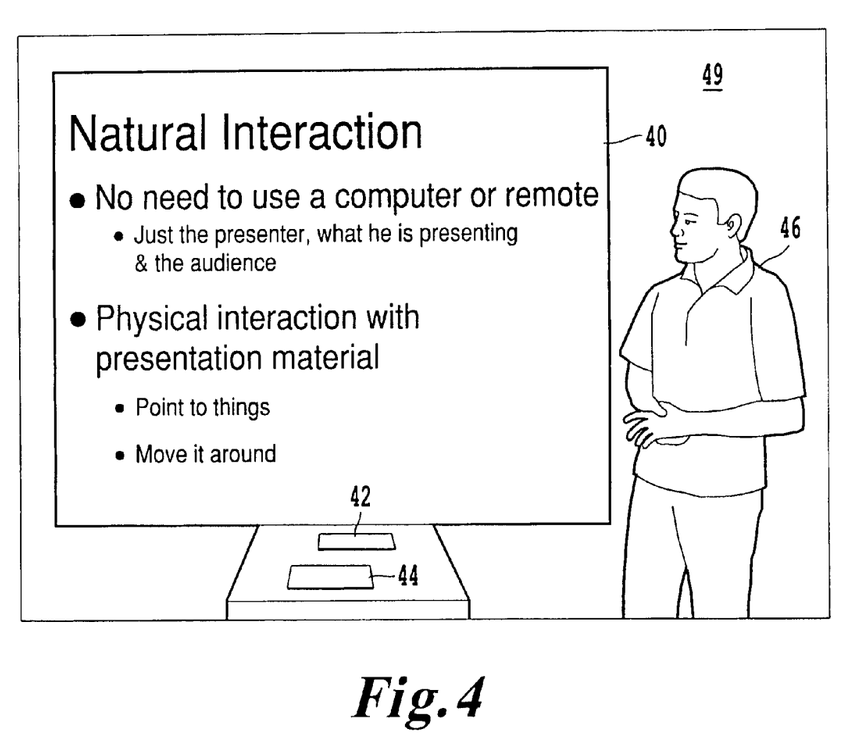
FIG. 4 is an illustrative example of a video conference environment for presenting augmented images according to an exemplary embodiment.

FIG. 4 is an illustrative example of a video conference environment for presenting augmented images according to an exemplary embodiment. In FIG. 4, a presenter 46 is depicted standing in the scene imagery 49 recorded by the imaging device 12 along with the virtually rendered presentation material 40 that is augmented into the scene imagery by the virtual object rendering unit 209 via the presentation marker 42 located on the table 48. An additional marker 44 placed on the table 48 is also depicted within the scene imagery 49.

As noted previously and according to one exemplary embodiment, the presenter 46 has the ability, via the gesture identification unit 208, to change both the appearance of the presentation material 40 and the contents of the presentation material 40 without requiring the use of a connected device 200 or a remote. For example, by using two markers, the presenter 46 can switch the video information sent to the receiving endpoint 212 such that the presentation material 40 is the only information that is transmitted to the display 216 via the video receiving unit 214. This full screen transition effect can be accomplished by moving the presentation marker 42 to within close proximity or within the portion of the scene imagery 49 occupied by the additional marker 44. If the presenter 46 then moves the presentation marker 42 back away from the additional marker 44 such that they are no longer within close proximity, the video information of the scene imagery 49 returns to displaying the virtually rendered presentation material 40 along with the presenter 46 and any other information displayed in the frame of the imaging device 12. The virtually rendered presentation material 40 can also be virtually increased in size as the presenter 46 moves the presentation marker 42 closer to the additional marker 44 and likewise the presentation material 40 can be virtually decreased in size as the presenter 46 moves the presentation marker further from the additional marker 44.

In addition to changing the size of the presentation material 40 within the scene imagery 49, the presenter 46 can also change the contents of the presentation material 40 through a variety of hand gestures. As discussed previously, QR codes can be decoded by the video conferencing system to download presentation material 40 from a remote location via the network 10. Using the QR codes, no external devices 200 are required to be connected to the video conferencing system 2 and therefore the presenter 46 controls and/or changes the presentation material 40 by using hand gestures. Therefore, the presenter can use hand gestures to control the front side of the presentation or the back side of the presentation based on what type of information the presenter wants to discuss. For example and as discussed previously, the presenter may move the marker to transition from the front side presentation material to the backside back side of the presentation material which can include biographical information about the presenter or additional information relating to the presentation material such as a webpage or an image the speaker is currently discussing in the presentation. Further, the presenter 46 can perform a rightward swiping motion over the virtually displayed presentation material 40 in order to transition to a different set of information such as the next presentation slide. Conversely, the presenter 46 can perform a leftward swiping motion over the virtually displayed presentation material 40 in order to transition to a previous presentation slide. The presentation material 40 can also be animated to provide the appearance that it is sliding off the screen to transition to the new material coming onto the screen in conjunction with the movement of the presenter's 46 swiping motion.

The presenter 46 can also perform an expanding motion by moving both hands in an outward direction while over the presentation material 40 in order to make the presentation material 40 full screen with respect to the scene imagery 49 transmitted in the video information to the external device 14. The presenter 46 can also perform a downward swiping motion in order to display a list of different files and/or slide shows available to be augmented over presentation marker 42 in the scene imagery 49. Once the list of files and/or slide shows is displayed, the presenter 46 can then point to a particular file and/or slide show which is then loaded by the video conferencing system 2 and augmented into the scene imagery 49 over the presentation marker 42 as the new presentation material 40. Further, the presenter 46 can perform a highlighting of particular contents in the presentation material 40 or zoom in or zoom out the presentation material 40 by pointing to a specific portion of the slide and maintaining that pose for a predetermined period of time. The predetermined time can be set by the presenter 46 such that the video conferencing device 2 does not highlight or zoom until it recognizes that the presenter 46 wants to highlight or zoom.

Another feature provided by the video conferencing system 2 is the ability to present three dimensional objects within the scene imagery such that remote audience members seeing the scene imagery 49 via the external device 14 can get a better view of the contents being discussed within the presentation material 40. For example, if the presenter 46 is presenting plans for a new offshore oil platform, at some stage during the presentation the presenter 46 may want to show an actual three-dimensional model of the offshore oil platform. To create this effect, the presenter 46 can perform an upward swiping motion on a presentation slide containing an image which the presenter is discussing to remove the presentation slide by no longer virtually rendering the information over the presentation marker 42. A three dimensional version of an image previously contained within the removed presentation material 40, such as a VRML file, is then virtually rendered by the virtual object rendering unit 209 onto the presentation marker 42 at the same spot as the image previously contained with the removed presentation material. The three-dimensional version of the image can also be virtually rendered onto the additional marker 44. The newly augmented three-dimensional scene imagery is then transmitted to the external device 14 to be viewed by the remote audience members. The presenter 46 then has the ability to move, just as he did with the presentation material 40, the three dimensional object rendered onto the presentation marker 42 or the additional marker 44 around within the scene imagery to better explain the construction and layout of the oil platform. This type of presentation gives the remote audience members a better view of what the presenter 46 was originally describing with respect to the two-dimensional image previously displayed in the presentation material 40 before it was removed with the upward swiping motion. The presenter 46 can then perform a swiping down motion which would cause the virtual object rendering unit 209 to remove the three-dimensional image of the oil platform and reinstate the previously removed presentation material 40 containing the two-dimensional image of the oil platform.

A swipe up or swipe down gesture by the presenter may also be mapped to switching the scene imagery to display whatever is displayed on a PC 16 or mobile device 8 connected to the video conferencing unit 2. An opposite swipe gesture of that required to switch the scene imagery to the connected external device 200 could then be employed to return to the presentation material to being augmented within the scene imagery. This allows a presenter to quickly and seamlessly transition to any type of software and/or program that may be running on the PC 16 or mobile device 8 without interrupting the flow of the presentation.

Obviously, numerous modifications and variations of the gesture features described above are possible in light of the above teachings. Therefore, as would be understood by one of ordinary skill in the art, the above-noted gesture features may be practiced otherwise than as specifically described herein. As such, the various swiping motions can be recognized by the video conferencing device 2 as performing different functions than those listed above. For example, the upward swiping motion can be used to display a list of different files and/or slide shows and the downward swiping motion can be used to display three dimensional objects.

When the presenter 46 is performing the various gestures, the video conferencing device 2 via the gesture identification unit 208 must determine whether the presenter 46 is actually intending to alter the presentation material 40. For example, movement in the background of the scene imagery 49 by something other than the presenter 46 may cause the gesture identification unit 208 to incorrectly detect a gesture by the presenter, this may cause the virtual object rendering unit 209 to render the presentation in a manner unexpected by the presenter. Therefore, in one embodiment of the present invention, the gesture identification unit 208 determines a position and/or depth of which the gesture by the presenter 46 exceeds the boundary planes of the presentation material 40. For example, the gesture identification unit 208 can virtually measure the length, height and width of the virtually rendered presentation material and determine that only gestures extending into the boundary of the presentation material 40 within the scene imagery 49 which exceed a certain length, height and/or width cause changes to the presentation material 40.

Alternatively, the video conferencing unit 2 can locate the presenter from within the scene imagery by detecting faces in the scene and monitoring which of the faces detected has moving lips. Once the presenter is identified, their hands could be located and tracked thereby ensuring only hand gestures of the speaker are used for gesture control of the presentation. In another embodiment, the identity of the presenter can be encoded into a QR code based marker (i.e. the name John Doe could be encoded into the marker) such that the video conferencing unit 2 could load a facial image corresponding to the QR ID info and identify the speaker by using a Facial Recognition System. Therefore, the video conferencing unit can uniquely identify John Doe out of all the faces present in the scene and thereby only monitor hand gestures performed by John Doe when establishing gesture based actions performed during the presentation.

Another important feature of the video conferencing device 2 via the virtual object rendering unit 209 is the ability to allow real objects, such as the presenter 46 to occlude virtual objects such as the presentation material 40 or a three-dimensionally rendered object in order to avoid the presentation material 40 being virtually rendered in the foreground of any real object within the scene imagery 49. For example, if the presenter 46 puts his arm out in front of the presentation material 40 displayed within the scene imagery 49, then the presenter's 46 arm should block the part of the presentation material 40 covered by the presenter's 46 arm. Therefore, the video conferencing device 2 determines the three-dimensional structure of the scene, such as the depth of real objects from a given viewpoint, in order to correctly create the appropriate real object occlusions within the scene imagery 49. Alternatively, a depth imaging device could be used instead of or in addition to the imaging device 12 to create depth images of the scene imagery 49 thereby enabling virtual object occlusion.

Further improvements provided by the video conferencing device 2 include higher quality rendering, using antialiasing for example, of virtual object shadows being cast on the real environment which can increase the scene realism substantially even when rendered in a manner inconsistent with the actual lighting in the scene. These improvements increase the rendering quality and believability of the virtual objects when rendered by the virtual object rendering unit 209 thereby making the virtual objects blend into the real environment more seamlessly. Additionally, ensuring accurate lighting of the virtual objects so as to appear consistent with the lighting of the rest of the real environment ensures realistic and less intrusive looking virtual objects.

The video conferencing device 2 also provides that ability via the virtual object rendering unit 209 to more realistically cover up markers displayed within the scene imagery 49 after they have been detected by the marker detection unit 206. For example, the appearance of the presentation marker 42 and/or the additional marker 44 can be unsightly and distracting to audience members viewing the scene imagery 49. When using augmented reality, the markers are sometimes manufactured as a black square with white inside along with a black pattern at the center. It should be noted, however, that many types of markers exist, such as circular markers, retro-reflective markers or active markers. However, in order to make these markers less obtrusive a white square can be rendered by the virtual object rendering unit 209, in addition to the presentation material 40, over any of the markers detected by the marker detection unit 206 within the scene imagery 49. As such, the white square rendered by the virtual object rendering unit 209 will make the designated marker appear within the scene imagery 49 merely as a blank piece of paper that was left sitting on the desk rather than an obtrusive marker with a distracting pattern.

Instead of covering the marker with a white box, the virtual object rendering unit 209 can also replace the marker with an image. In order to create such an effect, the shading of the real object is determined and applied to the virtual object to increase the realism of the final scene displayed within the scene imagery 49. Therefore, for example, a company's logo can be rendered to be consistent with the scene lighting as it applies to the marker surface. This provides the ability for the presenter 46 to custom-tailor a presentation beforehand or during the presentation itself based on the audience members in a way that can more actively engage and impress the audience members.

The video conferencing device 2 via the marker detection unit 206 can also detect a tablet PC displayed in the scene imagery 49 as a marker instead of a printed, static marker. As such, the tablet PC can produce a variety of markers on screen which are then detected by the marker detection unit 206 just like a printed marker. The approach of using a tablet PC for a marker instead of a printed static marker provides a variety of advantages. First, the use of a tablet PC for showing the marker means the marker is effectively dynamic rather than static as is the case when using a printed marker. Therefore, the marker can change whenever the presenter 46 desires thereby allowing the presenter 46 to load a variety of different AR presentations simply by showing the different marker on the table PC screen. This is particularly true if the marker is QR code based as the presenter 46 can easily change the data encoded in the QR code on the fly without having to print another marker. Additionally, controls can be provided on the touch screen of the tablet PC thereby enabling slide navigation such as swiping left or right to proceed to the next or previous frame.

Figure 5:
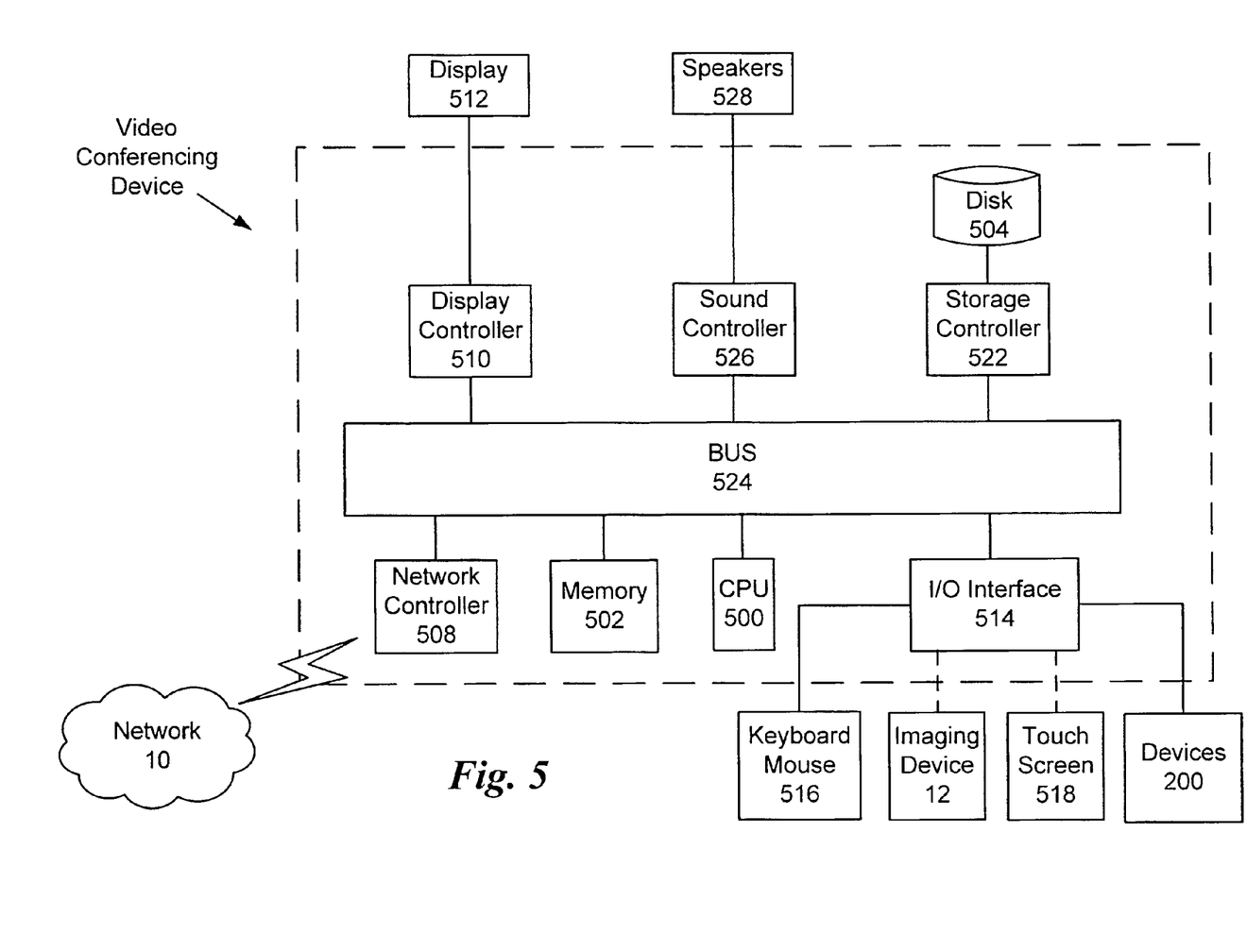
FIG. 5 is a schematic diagram of a video conferencing device for presenting augmented images according to an exemplary embodiment.

Next, a hardware description of the video conferencing device 2 according to exemplary embodiments is described with reference to FIG. 5. In FIG. 5, the video conferencing device 2 includes a CPU 500 which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer aided design station communicates, such as a server or computer.

Further, the claimed advancements may be provided as a utility application, background daemon, or component of an operating system, or combination thereof, executing in conjunction with CPU 500 and an operating system such as Microsoft Windows 7, UNIX, Solaris, LINUX, Apple MAC-OS and other systems known to those skilled in the art.

CPU 500 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 500 may be implemented as multiple processors cooperatively working in parallel to perform the instructions of the inventive processes described above.

The video conferencing device 2 in FIG. 5 also includes a network controller 508, such as an Intel Ethernet PRO network interface card from Intel Corporation of America, for interfacing with network 10. As can be appreciated, the network 10 can be a public network, such as the Internet, or a private network such as an LAN or WAN network, or any combination thereof and can also include PSTN or ISDN sub-networks. The network 10 can also be wired, such as an Ethernet network, or can be wireless such as a cellular network including EDGE, 3G and 4G wireless cellular systems. The wireless network can also be WiFi, Bluetooth, or any other wireless form of communication that is known.

The video conferencing device 2 further includes a display controller 510, such as a NVIDIA GeForce GTX or Quadro graphics adaptor from NVIDIA Corporation of America for interfacing with display 512, such as a Hewlett Packard HPL2445w LCD monitor. A general purpose I/O interface 514 interfaces with a keyboard and/or mouse 516 as well as a touch screen panel 518 on or separate from display 512. In addition, the general purpose I/O interface connects with imaging devices 12, such as a Canon XH G1s, a Sony F65 or a mobile device 8 camera to receive scene imagery. The general purpose I/O interface also connects with a plurality of devices 200 such as a PC 16, VCR/DVD/BLU-RAY player 214, document camera 202 and server 4.

A sound controller 526 is also provided in the video conferencing device 2, such as Sound Blaster X-Fi Titanium from Creative, to interface with speakers/microphone 528 thereby providing sounds and/or music.

The general purpose storage controller 522 connects the storage medium disk 504 with communication bus 524, which may be an ISA, EISA, VESA, PCI, or similar, for interconnecting all of the components of the video conferencing device 2. A description of the general features and functionality of the display 512, keyboard and/or mouse 516, as well as the display controller 510, storage controller 522, network controller 508, sound controller 526, and general purpose I/O interface 514 is omitted herein for brevity as these features are known.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order depending upon the functionality involved.

Obviously, numerous modifications and variations of the present invention are possible in light of the above teachings. It is therefore to be understood that within the scope of the appended claims, the present invention may be practiced otherwise than as specifically described herein.

The invention claimed is:

1. A video-conferencing device for presenting augmented images, comprising:
   at least one interface;
   a network; and
   a computer processor programmed to
      receive first information identifying a scene via the at least one interface;
   detect whether the scene contains at least one marker;
      identify a location of each detected marker within the scene;
      augment, in response to determining the scene contains a first marker and based on the location of the first marker, a portion of the scene containing the first marker with second information received via the at least one interface;
      identify at least one hand gesture of a user from the scene;
      identify a hand gesture location with respect to the scene containing the second information, wherein the hand gesture location indicates a gesture distance at which the at least one hand gesture extends over the portion of the scene containing the second information;
      change the second information based in part on the hand gesture location; and
      transmit the augmented scene to at least one external device via the network.

2. The video conferencing device according to claim 1, wherein the computer processor is further programmed to augment an entirety of the scene with the second video information based on the location of the first marker in the scene with respect to the location of a second marker detected in the scene.

3. The video conferencing device according to claim 1, wherein the first information and second information are contained within a single video channel.

4. The video conferencing device according to claim 1, wherein the computer processor is further programmed to decode an image located on the first marker to obtain location information identifying an external location of the second information, and to receive the second information from the external location via the network.

5. The video conferencing device according to claim 1, wherein the computer processor only changes the second information in response to identifying a gesture distance of at least half of the portion of the scene containing second information.

6. The video conferencing device according to claim 1, wherein an entirety of the scene is augmented with the second information based on the at least one hand gestures and the gesture distance.

7. The video conferencing device according to claim 1, wherein the second information is a slide show having a plurality of slides.

8. The video conferencing device according to claim 7, wherein the computer processor is further programmed to navigate through the plurality of slides based on the gesture distance and a direction and motion of the at least one hand gesture.

9. The video conferencing device according to claim 7, wherein the computer processor is further programmed
   to remove a slide displaying an image based on the gesture distance and in response to identifying an upward swiping hand gesture from the user; and
   to augment a portion of the scene containing a second marker with a three-dimensionally modeled image of the image previously removed from the slide.

10. The video conferencing device according to claim 7, wherein the computer processor is further programmed
    to remove a slide displaying an image based on the gesture distance and in response to identifying an upward swiping hand gesture from the user; and
    to augment a portion of the scene containing the first marker with a three-dimensionally modeled image of the image previously removed from the slide at a same location as the image was displayed on the previously removed slide.

11. The video conferencing device according to claim 7, wherein the computer processor is further programmed to highlight or zoom a portion of a slide in response to identifying at least one hand gesture of pointing to a specific portion of the slide and maintaining the at least one hand gesture for a predetermined period of time.

12. The video conferencing device according to claim 7, wherein the computer processor is further programmed
    to display a list of different slide shows in response to identifying a downward swiping hand gesture from the user; and
    to identify a hand gesture selecting a particular slide show from the list of different slide shows; and to augment the portion scene containing the first marker with the selected slide show.

13. A video-conferencing method for presenting augmented images, comprising:
    receiving first information identifying a scene via at least one interface;
    detecting whether the scene contains at least one marker;
    identifying a location of each detected marker within the scene;
    augmenting, with a CPU, in response to determining the scene contains a first marker and based on the location of the first marker, a portion of the scene containing the first marker with second information received via the at least one interface;
    identifying at least one hand gesture of a user from the scene;
    identifying a hand gesture location with respect to the scene containing the second information, wherein the hand gesture location indicates a gesture distance at which the at least one hand gesture extends over the portion of the scene containing the second information;
    changing the second information based in part on the hand gesture location; and
    transmitting the augmented scene to at least one external device via a network.

14. The video conferencing method according to claim 13, wherein the second information is a slide show having a plurality of slides.

15. The video conferencing method according to claim 14, further comprising:
    removing a slide displaying an image based on the gesture distance and in response to identifying an upward swiping hand gesture from the user; and
    augmenting a portion of the scene containing the first marker with a three-dimensionally modeled image of the image previously removed from the slide at a same location as the image was displayed on the previously removed slide.

16. A non-transitory computer-readable medium storing computer readable instructions thereon that when executed by a computer processor cause the computer processor to perform a video-conferencing method for presenting augmented images, comprising:

receiving first information identifying a scene via at least one interface;

detecting whether the scene contains at least one marker;

identifying a location of each detected marker within the scene;

augmenting, in response to determining the scene contains a first marker and based on the location of the first marker, a portion of the scene containing the first marker with second information received via the at least one interface;

identifying at least one hand gesture of a user from the scene;

identifying a hand gesture location with respect to the scene containing the second information, wherein the hand gesture location indicates a gesture distance at which the at least one hand gesture extends over the portion of the scene containing the second information;

changing the second information based in part on the hand gesture location; and transmitting the augmented scene to at least one external device via a network.

17. The non-transitory computer-readable medium according to claim 16, wherein the second information is a slide show having a plurality of slides, and further comprising:

removing a slide displaying an image based on the gesture distance and in response to identifying an upward swiping hand gesture from the user; and augmenting a portion of the scene containing the first marker with a three-dimensionally modeled image of the image previously removed from the slide at a same location as the image was displayed on the previously removed slide.

* * * * *